United States Patent
Gross et al.

(10) Patent No.: US 10,025,840 B2
(45) Date of Patent: Jul. 17, 2018

(54) METHOD AND SYSTEM FOR MAKING MULTISITE PERFORMANCE MEASURE ANONYMOUS AND FOR CONTROLLING ACTIONS AND RE-IDENTIFICATION OF ANONYMOUS DATA

(71) Applicant: KONINKLIJKE PHILIPS N.V., Eindhoven (NL)

(72) Inventors: Brian David Gross, North Andover, MA (US); Issac Eldo, Chelmsford, MA (US)

(73) Assignee: Koninklijke Philips N.V., Eindhoven (NL)

( * ) Notice: Subject to any disclaimer, the term of this patent is extended or adjusted under 35 U.S.C. 154(b) by 252 days.

(21) Appl. No.: 14/647,605

(22) PCT Filed: Dec. 9, 2013

(86) PCT No.: PCT/IB2013/060736
§ 371 (c)(1),
(2) Date: May 27, 2015

(87) PCT Pub. No.: WO2014/091385
PCT Pub. Date: Jun. 19, 2014

(65) Prior Publication Data
US 2015/0302070 A1 Oct. 22, 2015

Related U.S. Application Data

(60) Provisional application No. 61/735,245, filed on Dec. 10, 2012.

(51) Int. Cl.
G06F 17/30 (2006.01)
H04L 29/08 (2006.01)

(52) U.S. Cl.
CPC .. *G06F 17/30569* (2013.01); *G06F 17/30286* (2013.01); *G06F 17/30876* (2013.01); *H04L 67/10* (2013.01)

(58) Field of Classification Search
CPC ..................... G06F 17/30286; G06F 17/30569
(Continued)

(56) References Cited

U.S. PATENT DOCUMENTS 6,061,789 A 5/2000 Hauser et al.
6,374,241 B1 * 4/2002 Lamburt ........... G06F 17/30873
(Continued)

FOREIGN PATENT DOCUMENTS

WO 0239341 A1 5/2002

OTHER PUBLICATIONS

Seung et al. ("Denormalization strategies for data retrieval from data warehouses", Available online at www.sicencedirect.com; Decision support systems 42 (2006) 267-282; Available online Jan. 20, 2005).*

(Continued)

*Primary Examiner* — Jay A Morrison
*Assistant Examiner* — Ken Hoang (57) ABSTRACT

A system for making data source anonymous including a plurality of data sources, each data source including a data creation engine which creates normalized data in accordance with a common schema and a transformation engine which de-normalizes the normalized data such that the data source cannot be inferred by other data sources and transmits the de-normalized data to a remote computing resource. A remote computing resource receives and stores the de-normalized data from the plurality of data sources.

19 Claims, 7 Drawing Sheets

(58) Field of Classification Search
USPC .......... 707/E17.014, E17.005, E17.044, 769,
707/737, 748, E17.002, E17.008,
707/E17.046, 602, 692, 723, 736, 803,
707/805, 809, E17.001, E17.007,
707/E17.009, E17.011, E17.032, E17.033,
707/E17.045, E17.082, E17.09, E17.108,
707/E17.127, 600, 601, 607, 608, 609,
707/622, 687, 690, 693, 695, 696, 706,
707/708, 711, 732, 733, 739, 740, 741,
707/743, 752, 754, 755, 756, 758, 765,
707/771, 774, 784, 785, 792, 797, 798,
707/802, 804, 806, 808, 812; 705/4.39,
705/14.53, 14.23, 14.35, 26.4, 26.63,
705/27.1, 3, 306, 342, 44, 7.11, 7.13,
705/7.17, 7.27, 7.28, 7.31, 7.41; 709/1,
709/226, 224, 201, 204, 203, 222, 227;
715/764, 763, 771, 230, 246, 255, 760,
715/781, 810, 856, 863

See application file for complete search history.

(56) References Cited

U.S. PATENT DOCUMENTS

| | | |
|---|---|---|
| 2002/0035482 A1 | 3/2002 | Coble et al. |
| 2004/0210606 A1 | 10/2004 | Brown et al. |
| 2007/0192139 A1* | 8/2007 | Cookson ............... G06F 19/322 705/3 |
| 2009/0080408 A1* | 3/2009 | Natoli ................... G06F 19/322 370/351 |
| 2009/0300723 A1 | 12/2009 | Nemoy et al. |
| 2011/0112862 A1* | 5/2011 | Yu ..................... G06F 17/30867 705/3 |
| 2013/0103705 A1 | 4/2013 | Thomas |

OTHER PUBLICATIONS

Shin, S.K. et al. "Denormalization strategies for data retrieval from data warehouses", Decision Support Systems, Elsevier Science Publishers, Amsterdam, NL, vol. 42, No. 1, 2006, pp. 267-282.

Inan, A. et al., "Using Anonymized Data for Classification", Data Engineering, 2009, ICDE '09. IEEE 25th International Conference, Shanghai, pp. 429-440.

* cited by examiner

METHOD AND SYSTEM FOR MAKING MULTISITE PERFORMANCE MEASURE ANONYMOUS AND FOR CONTROLLING ACTIONS AND RE-IDENTIFICATION OF ANONYMOUS DATA

CROSS-REFERENCE TO PRIOR APPLICATIONS

This application is the U.S. National Phase application under 35 U.S.C. § 371 of International Application No. PCT/IB2013/060736, filed on Dec. 9, 2013, which claims the benefit of U.S. Provisional Application No. 61/735,245, filed on Dec. 10, 2012. These applications are hereby incorporated by reference herein.

The present application relates to analyzing clinical data by remote computing resources. It finds particular application in conjunction with systems and methods for making multisite performance measures anonymous. It further finds particular application in conjunction with systems and methods for controlling actions and re-identification of anonymous data. However, it is to be understood that it also finds application in other usage scenarios and is not necessarily limited to the aforementioned application.

Measuring performance of multiple healthcare sites is not only part of any quality improvement initiative, but is also required in many cases by the state, federal, private investors, and the like. Typically, there is a reluctance by healthcare sites to contribute data or a reduction of data fidelity, when healthcare sites are asked to share reporting. This is typically due to the fear that others will see areas where performance is lacking. This has resulted in delays identifying operational improvement projects, and more importantly, identifying disruptive innovators that practice care processes that result in significantly better outcomes over others.

Mapping sites to generic IDs has been used as a way of partly-de-identifying the performance data but it is still possible to decode several of the sites by knowing how many sites and units are a part of the system. For example, if there is a single hospital with a 12 bed intensive care unit (ICU) and a 12 bed coronary care unit (CCU) and an enterprise with 6 hospitals each with 6 ICUs (including a neonatal intensive care unit (NICU)) were coded, it would be obvious that the 36 units belong to the large facility and the 2 belong to the small. Similarly, if there were 3600 encounters in a year at one site and 78000 encounters at another, or NICU data in one site's data, it would be obviously which facility was which.

The present application supports the federation of many performance data bases in such a way that the any site could compare their results to the cohort without the risk that others in the cohort could infer their performance. This would ensure the anonymization of each site to the shared performance outcomes, while maintaining specific non-singular attributes in the data set.

Further, real time data analytics on de-identified datasets is the foundation to "big data" clinical research. One challenge is once the "right" patient sets are obtained, there is a need to gather different data or merge the data in the analytics repository with other non-de-identified data. This requires the re-identification of the de-normalized datasets.

By using fixed roles in the cloud to drive data manipulation processes, invoking an on-premise user authentication against those permissions, the site owning the data (contributing to the de-identified analytics system) is in control of actions permitted on that data (view, run reports, re-identify, export . . . ). Further, an authorization token is issued by the application to the site hosted action service in the form of a site issued toked. This allows the site to manage the user pool, and permit who they want to have those action permissions without adding these users to the cloud authentication system. More importantly, the token prevents an unauthorized user or fraudulent user who may learns the user role passwords in the cloud, from activating the re-identification service without first be authenticated by the owning site.

The present application further supports the federation of many de-identified clinical data bases in such a way that the site can manage who has the authority to perform specific actions on that data. Further, this system ensures that the action cannot be invoked without owning site user authentication. Further, this system ensures that the data re-identification process runs on the on-premise server therefore not sending protected health information (PHI) to the cloud.

The present application provides a new and improved apparatus and method which overcomes the above-referenced problems and others.

In accordance with one aspect, a system for making data source anonymous is provided. The system including a plurality of data sources, each data source including a data creation engine which creates normalized data in accordance with a common schema and a transformation engine which de-normalizes the normalized data such that the data source cannot be inferred by other data sources and transmits the de-normalized data to a remote computing resource. A remote computing resource receives and stores the de-normalized data from the plurality of data sources.

In accordance with another aspect, a method for making data source anonymous is provided. The method including creating normalized data in accordance with a common schema by a plurality of data sources, de-normalizing the normalized data such that the data source cannot be inferred by other data sources by a transformation engine, transmitting the de-normalized data to a remote computing resource, and storing the denormalized data from the plurality of data sources at the remote computing resource.

In accordance with another aspect, a system for making data source anonymous is provided. The system including a plurality of data sources, each data source including a data creation engine which creates normalized data in accordance with a common schema and transmits the normalized data to a remote computing resource. A remote computing resource receives and stores the normalized data from the plurality of data sources and includes a transformation engine which de-normalizes the normalized data such that the data source cannot be inferred by other data sources and stored the de-normalized data.

One advantage resides in the anonymization of healthcare clinical data.

Another advantage resides in re-identification of de-normalized data based on user authentication without sending credentials outside the hosting domain.

Another advantage resides in controlling actions based on user roles without having to exposing the actual authenticated users to the cloud environment.

Another advantage resides in the federated host to define what and how to decimate the sending data prior to transmission thus further protecting the source data from interception.

Another advantage resides in improve access to benchmarking data due to the reduced risk of unauthorized re-identification of site, unit, user, or patient information.

Another advantage resides in improve clinical care and efficiency that results from benchmarking enabled by this invention.

Still further advantages of the present invention will be appreciated to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
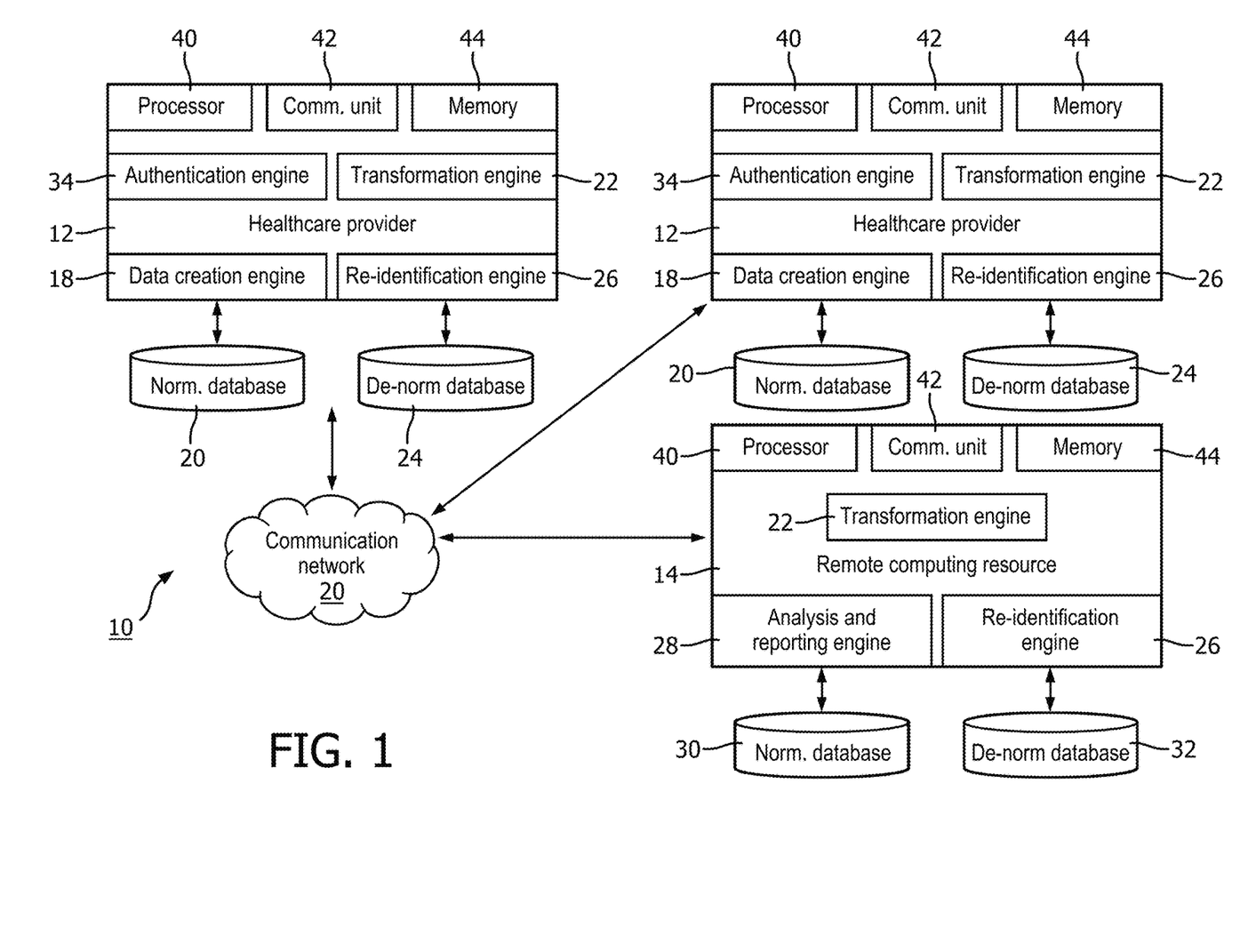
FIG. 1 is a block diagram of an IT infrastructure in accordance with the present application.

With reference to FIG. 1, a block diagram illustrates one embodiment of an information technology (IT) infrastructure 10 of a system for controlling access to clinical data analyzed by a remote computing resource. The IT infrastructure 10 suitably includes one or more healthcare systems and providers 12, a remote computing resource or federated data store 14, and the like, interconnected via a communications network 16. It is contemplated that the communications network 16 includes one or more of the Intranet, a local area network, a wide area network, a wireless network, a wired network, a cellular network, a data bus, a personal area network, and the like. The healthcare provider 12 collects clinical data related to one or more patients cared for by the healthcare system or medical institution which is analyzed and stored by the remote computing resource 14, which in one embodiment is located in a cloud infrastructure. In other embodiments the system may be located at a single location. In yet another embodiment may exist in a secure environment, but data transmission is over public media or shared infrastructure.

As used herein, "cloud" may refer to a collection of resources (e.g., hardware, data and/or software) provided and maintained by an off-site or off-premise party (e.g., third party), wherein the collection of data and resources can be accessed by an identified user via a network. The resources can include data storage services, data processing services (e.g., applications), and many other services that are conventionally associated with and reside within personal computers, local or "on-premise" servers, having at least one processing device such as a microprocessor, graphics processor among other processing devices and associated components. In general, cloud computing may be employed to perform services in a dissociative way, i.e., the client may not know where the service is performed as long as the service is performed with the expected quality of service.

As used herein, "clinical data" may refer to data collected from a patient or from a medical institution in any number of conventional ways. For example, clinical data may be collected in the field by a healthcare provider such as a physician or clinician. In another embodiment, clinical data includes data relating the wellness of a given patient or sub population. In another embodiment, clinical data includes data relating to the structure and local performance of the healthcare provider. Alternatively, a patient may be admitted to a healthcare provider such as a hospital or an emergency clinic and related clinical data may be collected by, for example, admissions or administration at the healthcare provider. Clinical data may be collected by other medical devices, such as, patient monitors including various subsystems for each vital sign such as SpO2, temperature, blood pressure, heart rate, etc., various imaging equipment, pacemaker monitors and interrogation devices, laboratory equipment, and other clinical data collection systems. Clinical data may also be collected by a patient's home monitoring systems, which may report physical, chemical, electrical or other patient's clinical parameters. Data collection used herein may be episodic, based on a predefined event or stochastic process, periodic, such as every 4 hours, or continuous. Data collection may be real time, near real-time or previously acquired and later uploaded.

The healthcare system, application, process, or provider (referred to as healthcare provider here forward) 12 creates data on behalf of the data owner, or processes the collected clinical data and securely transmits the clinical data to the remote computing resource 14 for analysis and/or reporting. After receiving the clinical data, the remote computing resource 14 processes the clinical data and generates one or more results and/or reports from the analysis. As described above, there is reluctance by healthcare providers to contribute clinical data or a reduction of clinical data fidelity, when healthcare providers are asked to share reporting. This is typically due to the fear that other healthcare provider will see areas where performance is lacking. Mapping sites to generic IDs has been previously used as a way of partly de-identifying the clinical data. However, due to the contents of the clinical data it is still possible to decode several of the sites by knowing basic knowledge about particular healthcare providers. As such, the present application supports the collection of clinical data in such a way that the any healthcare provider could compare their results and/or reports to a cohort healthcare provider without the risk that others could infer their performance. This would ensure the anonymization of each healthcare provider to the shared results and/or reports, while maintaining specific non-singular attributes in the clinical data set.

Specifically, the healthcare provider 12 includes a data creation engine 18 which creates clinical data in a normalized form on behalf of a data owner such as a patient, the healthcare provider itself, and the like which is then stored in a normalized data set database 20. In one embodiment, the clinical data created by the data creation engine 18 includes data collected from a patient or from a medical institution in any number of conventional ways. In another embodiment, the data creation engine 18 creates clinical data in accordance with a common schema such that the data can be identified and mappable to common terms among other healthcare providers and the remote computing resource 14. It should also be appreciated that the clinical data created by the data creation engine 18 includes unique attributes about the healthcare provider that would normally be a way of inferring the healthcare provider as the source of the clinical data such as the number of units, the unit types, number and type of procedures, number and type of tests, number of beds, number of patient encounters, number of facilities, and the like.

To de-normalize the clinical data such that other healthcare providers cannot infer the source of the clinical data, the healthcare provider 12 includes a transformation engine 22 that de-normalizes the clinical data created by the healthcare provider 12 which is stored in a de-normalized data set database 24. Specifically, the transformation engine 22 transforms the clinical data such that each unique attribute is de-normalized and anonymous when viewed with respect to other clinical data set. To accomplish this, the remote computing resource 14 determines a target number of entries for each unique attribute of the clinical data which is sent to or referenced by the transformation engine 22. For example, the remote computing resource 14 communicates a transformation format that instructs the transformation engine 22 how to decimate the clinical data including the target number of entries for each unique attribute to each healthcare provider 12. The target number for each unique attribute in the clinical data is set where healthcare provider anonymity is required. For example, if a first healthcare provider data set includes six (6) care units and a second healthcare provider data set includes two (2) care units, the remote computing resource 14 will determine the target number of entries for the care unit attribute to be the lowest common denominate of the entries of the datasets. In this case, the first healthcare provider data set would transform the six (6) care unit entries into a three (3) different two (2) care unit entries such making the first healthcare provider data set anonymous from the second healthcare provider data set. The transformation engine 22 transforms the clinical data according to the target number for each unique attribute such that the source of the clinical data is anonymous. Specifically, the transformation engine 22 de-normalizes the clinical data into one or more data cubes based on unique attributes that need to be anonymized, the target number of each unique attributes, and a data cube definition received from the remote computing resource 14. The data cube definition is a standard data format utilized by the remote computing resource 14 such that the de-normalized clinical data can be compared to other healthcare provider clinical data efficiently. In another embodiment, the transformation engine 22 generates a table of global unique identifiers (GUID) which maps each attribute in the de-normalized data back to the normalized data format. To re-identify the de-normalized data, a re-identification engine 26 utilizes the table of GUIDs to map back the de-normalized data to its original normalized format. The healthcare provider 12 also includes user input devices to input clinical data or adjust the target number of each unique attributes and/or data cube definition. In some embodiments, the healthcare provider 12 include display devices providing users a user interface within which to manually enter the clinical data and/or for displaying generated reports and/or analysis of the clinical data.

For example, in the scenario described in Table A, Healthcare Provider A includes three (3) hospitals (Hosp 1, 2, and 3) with various units (MICU, SICU, CCU, NICO, ICU, CVICU, RICU, and PICU) and a respective number of bed per unit. Healthcare Provider B includes a single hospital with three (3) units (CCU, ICU, and NICU) and a respective number of beds per unit.

TABLE A

| System | Hosp | Unit | Beds |
|---|---|---|---|
| A | 1 | MICU | 8 |
|  |  | SICU | 8 |
|  |  | CCU | 8 |
|  |  | NICU | 22 |

TABLE A-continued

| System | Hosp | Unit | Beds |
|---|---|---|---|
|  | 2 | CCU | 6 |
|  |  | ICU | 6 |
|  | 3 | CVICU | 16 |
|  |  | CCU | 24 |
|  |  | ICU | 16 |
|  |  | MICU | 8 |
|  |  | RICU | 8 |
|  |  | PICU | 16 |
|  |  | NICU | 60 |
| B | 1 | CCU | 12 |
|  |  | ICU | 12 |
|  |  | NICU | 24 |

In the remote computing system 14, there is a configuration which is read by the healthcare providers 12 and contains, in addition to the transformation cube definitions, the target number of attribute parameters for GUID replacement. In this example, the unit size is equal to six (=6) and unit number of units per hospital is equal to two (=2). In this example there is a need to anonymize the source bed. If data is not associated to a bed, but instead an encounter, the encounter data can be randomly assigned to a new federated unit representation.

The transformation engine 22 de-normalizes the clinical data by randomly break the beds from one care unit into units of six (6) beds and systems of hospitals with two (2) care units. As previously mentioned, the remote computing resource 14 communicates a transformation format that instructs the transformation engine 22 how to decimate the clinical data including the target number of entries for each unique attribute to each healthcare provider 12. Encounter data from patients admitted to these beds can now be represented as clinical data without a way for other suites to determine the source. Table B below describes a serialization of the transform identification to make it simple to see the transformation, but in the preferred embodiment, the transform identification would not be in any discernible order and contain a rather long alpha numeric random GUID. The following represents the resulting transformation:

TABLE B

| System | Hosp | Unit | Beds |
|---|---|---|---|
| A | 1a | MICU1 | 6 |
|  | 1a | MICU2 | 2 |
|  | 1b | SICU1 | 6 |
|  | 1b | SICU2 | 2 |
|  | 1c | CCU1 | 6 |
|  | 1c | CCU2 | 2 |
|  | 1d | NICU1 | 6 |
|  | 1d | NICU2 | 6 |
|  | 1e | NICU3 | 6 |
|  | 1e | NICU4 | 4 |
|  | 2a | CCU3 | 6 |
|  | 2a | ICU1 | 6 |
|  | 3a | CVICU1 | 6 |
|  | 3a | CVICU2 | 6 |
|  | 3b | CVICU3 | 4 |
|  | 3b | CCU4 | 6 |
|  | 3c | CCU5 | 6 |
|  | 3c | CCU6 | 6 |
|  | 3d | CCU7 | 6 |
|  | 3d | ICU2 | 6 |
|  | 3e | ICU3 | 6 |
|  | 3e | ICU4 | 4 |
|  | 3f | MICU3 | 6 |
|  | 3f | MICU4 | 2 |
|  | 3g | RICU1 | 6 |

TABLE B-continued

| System | Hosp | Unit | Beds |
|---|---|---|---|
| | 3g | RICU2 | 2 |
| | 3h | PICU1 | 6 |
| | 3h | PICU2 | 6 |
| | 3i | PICU3 | 4 |
| | 3i | NICU1 | 6 |
| | 3j | NICU2 | 6 |
| | 3j | NICU3 | 6 |
| | 3k | NICU4 | 6 |
| | 3k | NICU5 | 6 |
| | 3l | NICU6 | 6 |
| | 3l | NICU7 | 6 |
| | 3m | NICU8 | 6 |
| | 3m | NICU9 | 6 |
| | 3n | NICU10 | 6 |
| B | 1aa | CCU8 | 6 |
| | 1aa | CCU9 | 6 |
| | 1ab | ICU5 | 6 |
| | 1ab | ICU6 | 6 |
| | 1ac | NICU11 | 6 |
| | 1ac | NICU12 | 6 |
| | 1ad | NICU13 | 6 |
| | 1ad | NICU14 | 6 |

The transformation engine 22 also creates a table of GUIDs representing the descriptors which have been altered (in this case Hospitals and Units) and stores the reference table for re-identifying the data at the source healthcare provider. For Hospital Healthcare Provider B, Table C describes the table of GUIDs in this example.

TABLE C

| System | Hospital | Care Units | Federated Hospital | Federated Unit | Federated beds included |
|---|---|---|---|---|---|
| B | 1 | CCU | 1aa | CCU8 | 1, 3, 4, 7, 8, 9 |
| | | | 1aa | CCU9 | 2, 5, 6, 10, 11, 12 |
| | | ICU | 1ab | ICU5 | 2, 3, 6, 9, 10, 11 |
| | | | 1ab | ICU6 | 1, 4, 5, 7, 8, 12 |
| | | NICU | 1ac | NICU11 | 1, 6, 9, 11, 16, 18 |
| | | | 1ac | NICU12 | 3, 7, 8, 14, 15, 21 |
| | | | 1ad | NICU13 | 2, 4, 5, 17, 22, 24 |
| | | | 1ad | NICU14 | 10, 12, 13, 19, 20, 23 |

In this example, Healthcare Provider B would know that hospital IDs 1aa through 1ad represent their care units CCU8 and CCU9 and are specifically Healthcare Provider B's 16 bed care unit, but other healthcare providers looking at the data could not discern which of the bed CCUs are related to which hospital. When a healthcare provider 12 requests a report and/or analysis based on the stored federated data store, the healthcare provider 12 can compare their performance to other similar care units and facilities without knowing which source facility belongs to the cohort results. If the healthcare provider chooses to benchmark with each other, they simply need to share the table of GUIDs in order to see the performance and any benchmark healthcare providers who agree to share their identity with. The example above can easily be extended to cause a transformation of clinical data with healthcare providers 12 containing one hospital such that the table above would appear to be from forty-three (43) enterprises each one hospital with two (2) care units containing no more than six (6) beds. Additional descriptors can be added to the cube definition to assist operational research. For example, a new parameter can be added to the clinical data representation indicating if the federated unit is from a big unit (say more than 16 beds) or small.

The healthcare provider 12 then transmits the de-normalized clinical data to the remote computing resource 14 for further analysis and/or reporting via an analysis and reporting engine 28. For example, the analysis and reporting engine 28 may compare the healthcare provider's clinical data, such as local performance data, with baseline clinical data, all of which may be stored in or accessible by the remote computing resource 14. The analysis may also include the generation of one or more reports by the analysis and reporting engine 28, which may include performance reports, clinical recommendations or advisories, or chronological graphical reports, including charts indicating healthy and unhealthy results in clear and easy to read display formats, for example. In an exemplary embodiment, result and/or report data corresponding to the results are transmitted back to healthcare system, provider, or actual data owner 12 for further processing.

In another embodiment, the one or more healthcare providers 12 transmit normalized clinical data to the remote computing resource 14 which stores the normalized clinical data in a remote normalized data set database 30. To de-normalize the clinical data such that other healthcare providers cannot infer the source of the clinical data, the remote computing resource 14 includes a transformation engine 22 that de-normalizes the clinical data created by the healthcare provider 12 which is stored in a remote de-normalized data set database 32. The transformation engine 22 transforms the clinical data according to the target number for each unique attribute as described above. Specifically, the transformation engine 22 de-normalizes the clinical data into one or more data cubes based on unique attributes that need to be anonymized, the target number of each unique attributes, and a data cube definition of the remote computing resource 14. The transformation engine 22 also generates a table of global unique identifiers (GUID) which maps each attribute in the de-normalized data back to the normalized data format. To re-identify the de-normalized data, a re-identification engine 26 utilizes the table of GUIDs to map back the de-normalized data to its original normalized format. The remote computing resource 14 also includes user input devices to input clinical data or adjust the target number of each unique attributes and/or data cube definition. In some embodiments, the remote computing resource 14 include display devices providing users a user interface within which to manually enter the clinical data and/or for displaying generated reports and/or analysis of the clinical data.

Figure 2:
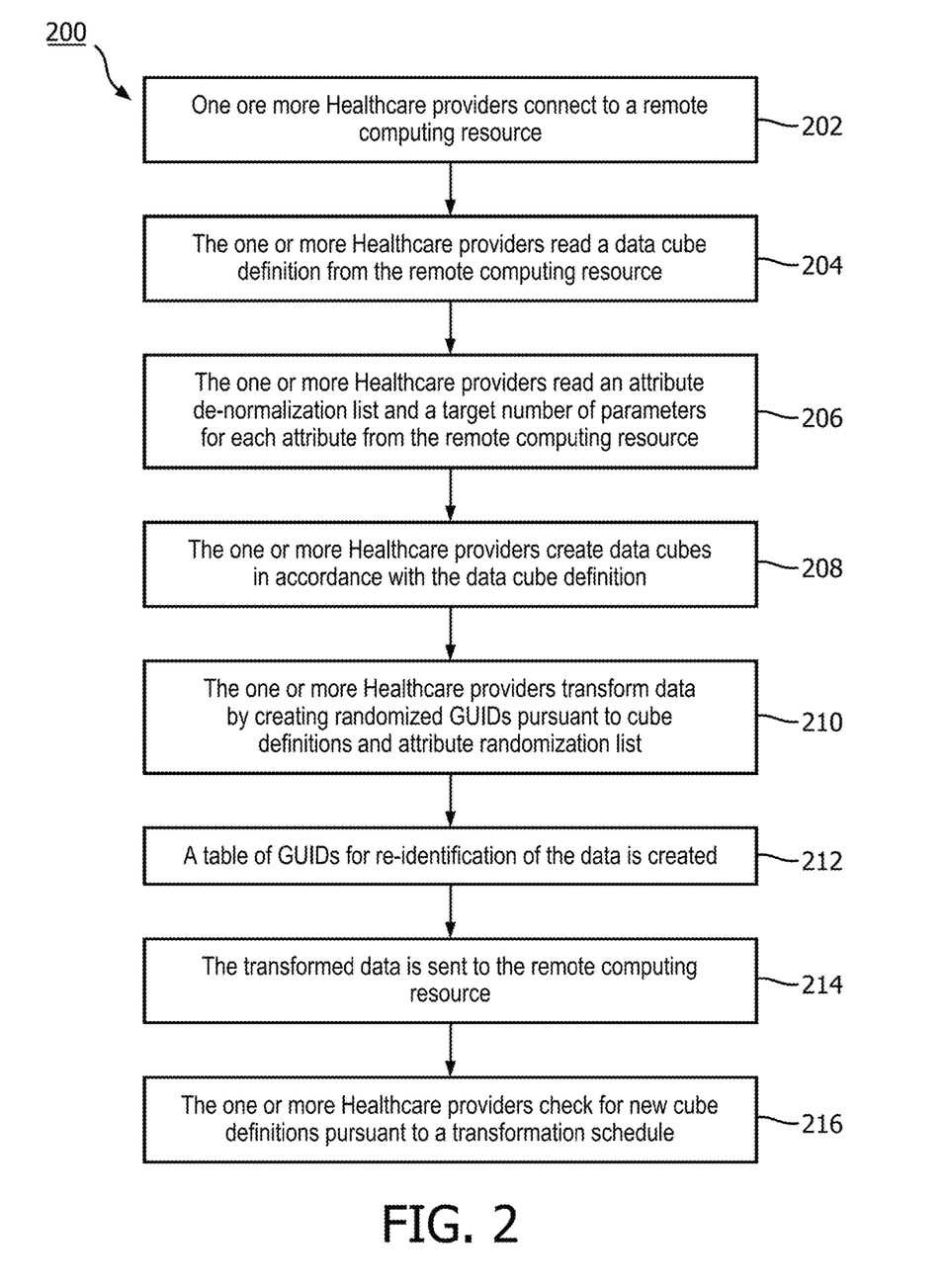
FIG. 2 is a flowchart diagram of a method for making multisite performance measures anonymous in accordance with the present application.

With reference to FIG. 2, a flowchart diagram 200 of a method for making multisite performance measures anonymous is illustrated. In a step 202, one or more healthcare providers connect to a remote computing resource. In a step 204, the one or more healthcare providers read a data cube definition from the remote computing resource. In a step 206, the one or more healthcare providers read an attribute de-normalization list and a target number of parameters for each attribute from the remote computing resource. In a step 208, the one or more healthcare providers create data cubes in accordance with the data cube definition. In a step 210, the one or more healthcare providers transform data by creating randomized GUIDs pursuant to cube definitions and attribute randomization list. In a step 212, a table of GUIDs for re-identification of the data is created on the healthcare provider. In a step 214, the transformed data is sent to the remote computing resource. In a step 216, the one or more healthcare providers check for new cube definitions pursuant to a transformation schedule.

With continuing reference of FIG. 1 and in the scenario in which the one or more healthcare providers 12 transmit normalized clinical data to the remote computing resource 14 which de-normalizes the clinical data, the remote computing resource 14 controls access and re-identification to the de-normalized data. Specifically, the remote computing resource includes predefined roles for what actions can be invoked by the users of the healthcare providers 12 when attempting to access and re-identify the de-normalized clinical data. These roles are synchronized with the healthcare provider's user roles for authentication. Specifically, a healthcare provider 12 user logs into a healthcare provider application and based on their approved roles, they are offered actions to invoke on the de-normalized clinical data such as creating a report list, unit list, patient report, etc. Once the user establishes the report of interest based on de-normalized data, the user can invoke the remote computing resource 14 to re-identify the de-normalized clinical data. This action causes a certificate to be transmitted from the healthcare provider 12 to the re-identification engine 26 of the remote computing resource 14. The de-normalized clinical data is then re-identified based on the table of GUIDs and the remote computing resource 14 matching the certificate stored in the remote computing resource 14 and certificate received from the healthcare provider 12.

Specifically, the one or more healthcare providers 12 includes an authentication engine 34 which enables a user to log into the healthcare provider application to select one or more actions to invoked on the analysis and reporting engine 28 of the remote computing resource 14 based off the roles set for that particular user. For example, if a user's approved role is a physician, the analysis and reporting engine 28 provides them with the ability to create a patient report. Similarly, if the user's role is an administrator, the analysis and reporting engine 28 enables the user to create reports relating to the performance of the one or more healthcare providers. After the user selects an action of interest based on the de-normalized data, the user is presented with the option to re-identify the de-normalized clinical data associated with their healthcare provider 12. If the user chooses to re-identify the de-normalized clinical data, authentication engine 34 transmits a certificate to the re-identification engine 22 of the remote computing resource 14. If the re-identification engine 22 of the remote computing resource 14 determines that the certificate received from the authentication engine 34 matches a certificate stored in the remote computing resource 14, the re-identification engine 22 utilizes the table of GUIDs to map back the de-normalized clinical data associated with the healthcare provider to its original normalized format. It should also be appreciated that the above authentication process can also be utilized for controlling access to the de-normalized clinical data in a similar fashion.

The components of the IT infrastructure 10 suitably include processors 40 executing computer executable instructions embodying the foregoing functionality, where the computer executable instructions are stored on memories 42 associated with the processors 40. It is, however, contemplated that at least some of the foregoing functionality can be implemented in hardware without the use of processors. For example, analog circuitry can be employed. Further, the components of the IT infrastructure 10 include communication units 44 providing the processors 40 an interface from which to communicate over the communications network 20. Even more, although the foregoing components of the IT infrastructure 10 were discretely described, it is to be appreciated that the components can be combined.

Figure 3:
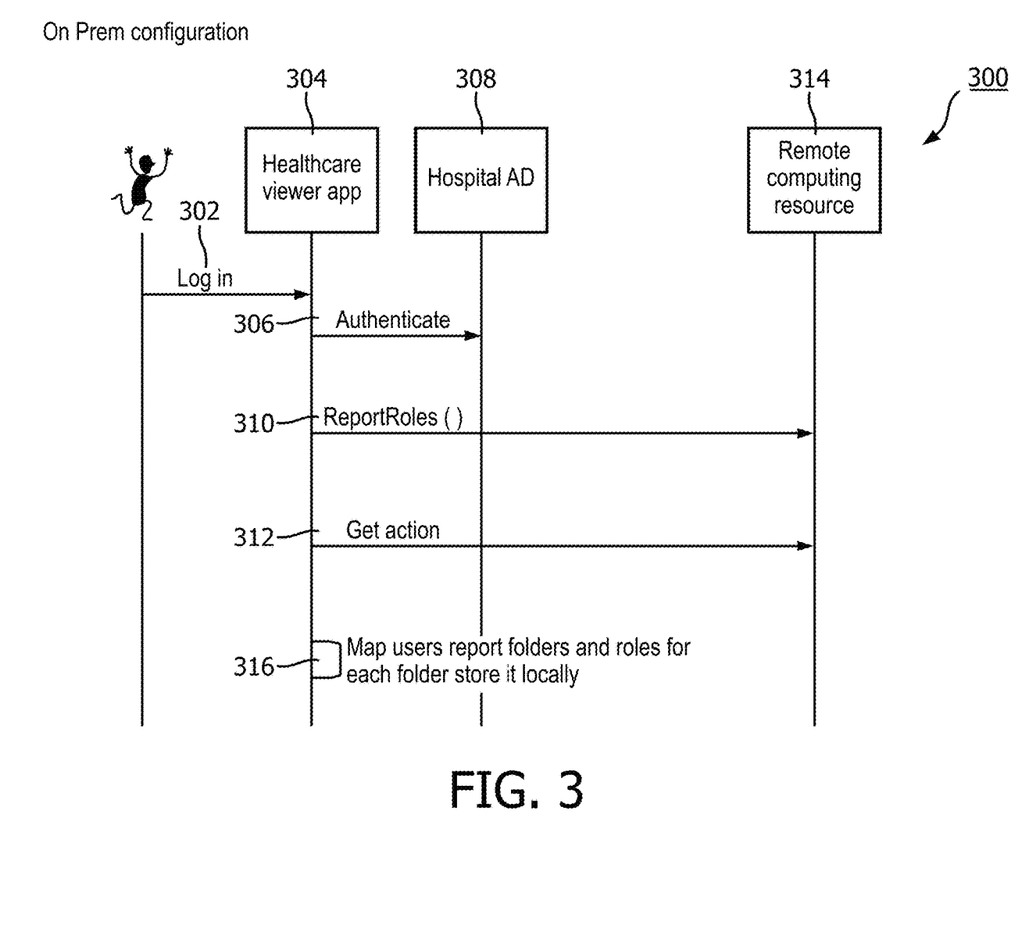
FIG. 3 is a diagram of a healthcare provider configuration in accordance with the present application.

With reference to FIG. 3, a diagram 300 of a healthcare provider configuration is illustrated. A user logs into 302 a health provider viewing application 304. The user is then authenticated 306 via a healthcare provider active directory 308. The health provider viewing application 304 reports the role of the user 310. An action to invoke on the de-normalized data 312 is selected by the user and communicated to the remote computing resource 314. The user's role and selected action then stored locally 316 for further processing.

Figure 4:
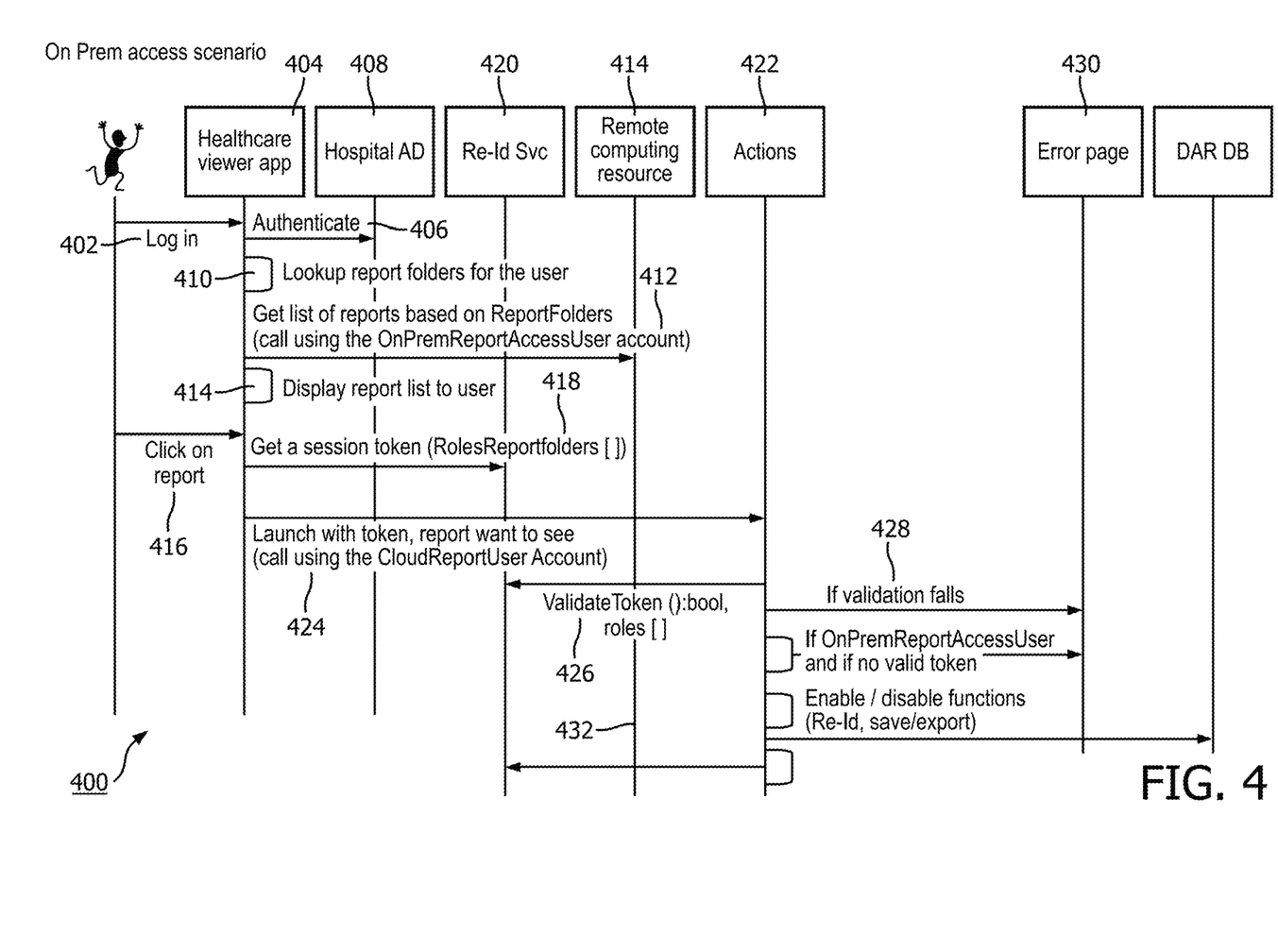
FIG. 4 is a diagram of a healthcare provider access scenario in accordance with the present application.

With reference to FIG. 4, a diagram 400 of a healthcare provider access scenario is illustrated. A user logs into 402 a healthcare provider viewing application 404. The user is then authenticated 406 via a healthcare provider active directory 408. The healthcare provider viewing application 404 looks up the action selected by the user to invoke on the de-normalized data 410. A list of actions to invoke on the de-normalized data available to the user 412 is provided from the remote computing resource 414 and displayed to the user 416 on the healthcare provider viewing application 404. The user clicks on an action 416 on the healthcare provider viewing application 404. In response to clicking on an action, a session token is sent 418 the re-identification service 420. The action invoked by the user 422 is launched with the token 424. In response to launching the invoked action, the token is validated 426 via the re-identification service 420. If the validation fails 428, an error page 430 is displayed. If the validation passes 432, the action is invoked and the data is normalized and displayed to the user.

Figure 5:
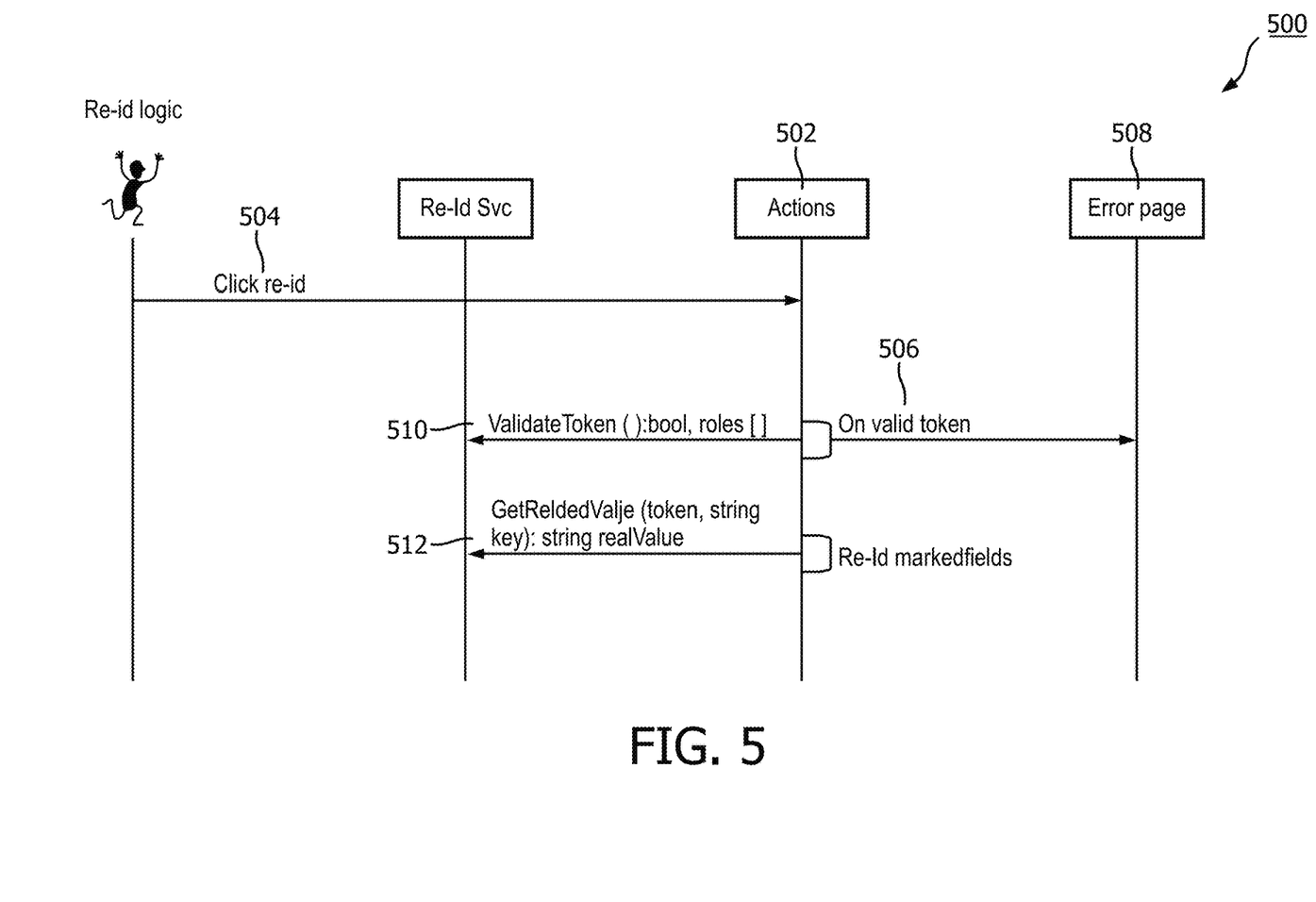
FIG. 5 is a diagram of the re-identification logic in accordance with the present application.
Figure 6:
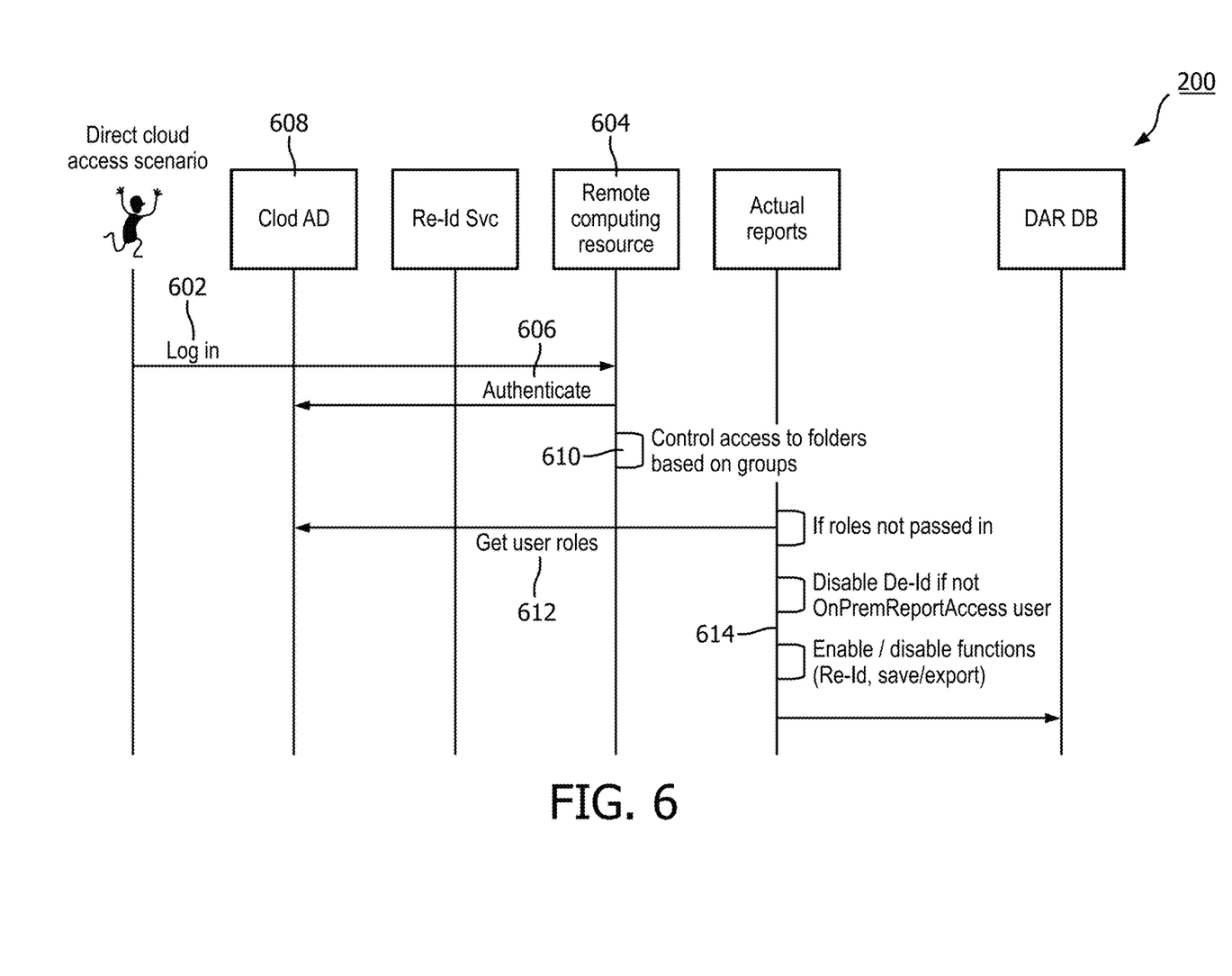
FIG. 6 is a diagram of direct cloud access scenario in accordance with the present application.

With reference to FIG. 5, a diagram 500 of the re-identification logic is illustrated. In selecting an action to invoke 502, a re-identification command 504 is transmitted to the re-identification service. If the validation of the token fails 506, an error page 508 is displayed. If the validation of the token passes 510, the action is invoked and the data is normalized 512 and displayed to the user With reference to FIG. 6, a diagram 600 of direct cloud access scenario is illustrated. A user logs into 602 a healthcare provider manager 604. The user is then authenticated 6066 via a cloud active directory 608. Access to the actions to invoke on de-normalized data is controlled based on the role of the user 610 which are received 612 from the cloud active directory 608. Based on the roles of the user, the function of viewing and accessing the de-normalized is controlled 614.

Figure 7:
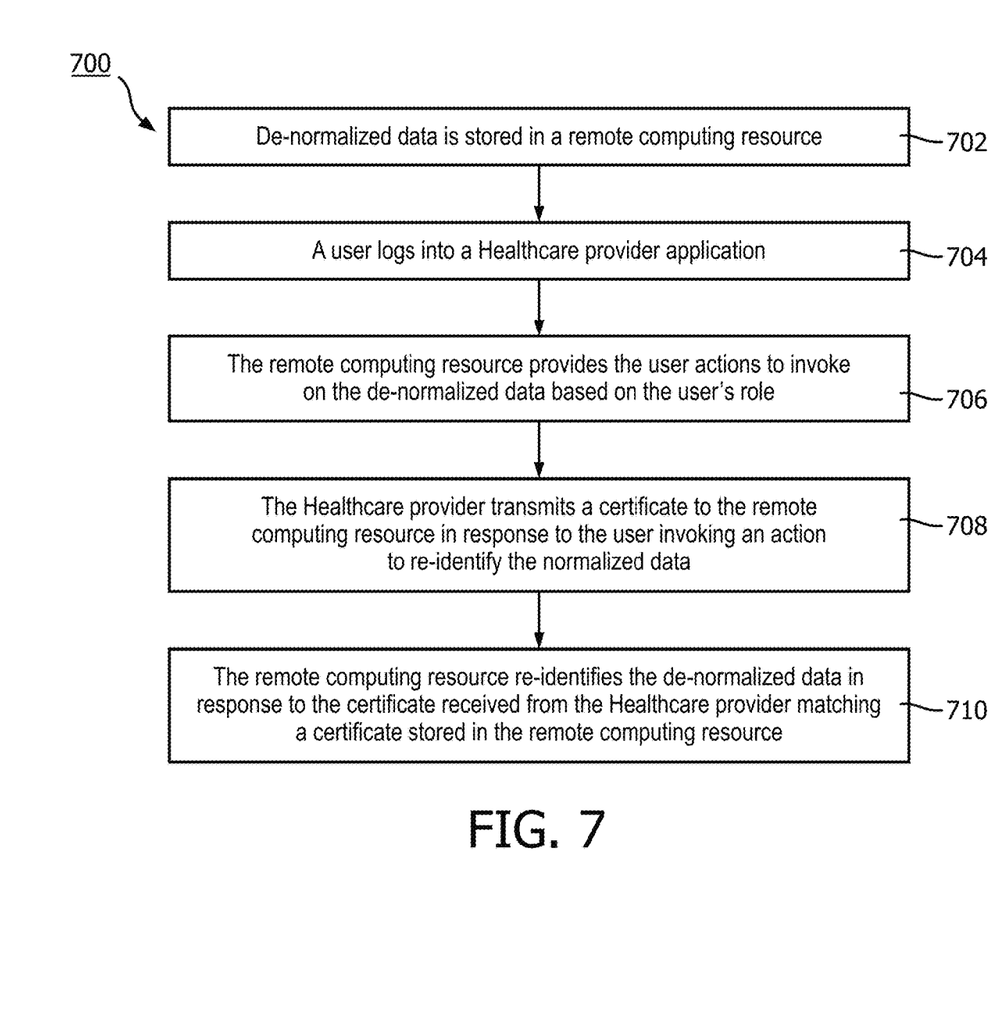
FIG. 7 is a flowchart diagram of a method for controlling action and re-identification of anonymous data in accordance with the present application.

With reference to FIG. 7, a flowchart diagram 700 of a method for controlling action and re-identification of anonymous data is illustrated. In a step 702, de-normalized data is stored in a remote computing resource. In a step 704, a user logs into a healthcare provider application. In a step 706, the remote computing resource provides the user actions to invoke on the de-normalized data based on the user's role. In a step 708, the healthcare provider transmits a certificate to the remote computing resource in response to the user invoking an action to re-identify the normalized data. In a step 710, the remote computing resource re-identifies the de-normalized data in response to the certificate received from the healthcare provider matching a certificate stored in the remote computing resource.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet/Intranet server from which the stored instructions may be retrieved via the Internet/Intranet or a local area network; or so forth. Further, as used herein, a processor includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; and a display device includes one or more of a LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A data source for making data source anonymous, the data source comprising:
    a data creation engine which creates normalized data in accordance with a common schema, wherein the normalized data comprises a unique attribute from which the identity of the data source is capable of being inferred; and
    a transformation engine which de-normalizes the normalized data such that the data source cannot be inferred by other data sources and transmits the de-normalized data to a remote computing resource, wherein de-normalizing the normalized data comprises:
        determining a target quantity for the unique attribute to populate each of a plurality of data groupings,
        splitting the normalized data into a plurality of groupings so that the unique attribute for each grouping does not exceed the target quantity, and
        associating each grouping of the plurality of groupings with a respective unique identifier,
        wherein the de-normalized data includes the plurality of groupings including respective unique identifiers.

2. The data source according to claim 1, wherein the transformation engine generates a table of global unique identifiers to map each unique attribute in the de-normalized data back to the normalized data format.

3. The data source according to claim 1, wherein the data source is a healthcare provider and the normalized data is clinical data.

4. The data source of claim 1, wherein:
    de-normalizing the normalized data further comprises determining an additional target quantity for an additional unique attribute of the normalized data; and
    splitting the normalized data comprises splitting the normalized data into a plurality of groupings so that the unique attribute for each grouping does not exceed the target quantity and the additional unique attribute does not exceed the additional target quantity.

5. The data source of claim 1, wherein determining the target quantity comprises using a lowest common denominator of the unique attribute across the normalized data entries as the target quantity.

6. A method for making data source anonymous, the method comprising:
    obtaining normalized data in accordance with a common schema by a plurality of data sources, wherein the normalized data comprises a unique attribute from which the identity of the data source is capable of being inferred;
    de-normalizing the normalized data such that the data source cannot be inferred by other data sources by a transformation engine, comprising:
        determining a target quantity for the unique attribute to populate each of a plurality of data groupings,
        splitting the normalized data into a plurality of groupings so that the unique attribute for each grouping does not exceed the target quantity, and
        associating each grouping of the plurality of groupings with a respective unique identifier,
        wherein the de-normalized data includes the plurality of groupings including respective unique identifiers; and
    transmitting the de-normalized data to a remote computing resource.

7. The method of claim 6, further comprising generating a table of global unique identifiers to map each unique attribute in the de-normalized data back to the normalized data format.

8. The method of claim 6, wherein the normalized data is clinical data.

9. The method of claim 6, wherein obtaining the normalized data comprises creating the normalized data.

10. The method of claim 6, wherein:
    de-normalizing the normalized data further comprises determining an additional target quantity for an additional unique attribute of the normalized data; and
    splitting the normalized data comprises splitting the normalized data into a plurality of groupings so that the unique attribute for each grouping does not exceed the target quantity and the additional unique attribute does not exceed the additional target quantity.

11. The method of claim 6, wherein determining the target quantity comprises using a lowest common denominator of the unique attribute across the normalized data entries as the target quantity.

12. A transformation engine device for making data source anonymous, the transformation engine device comprising:
    a memory and a processor configured to:
        receive normalized data in accordance with a common schema from a plurality of data sources, wherein the normalized data comprises a unique attribute from which the identity of the data source is capable of being inferred, and
        de-normalize the normalized data such that the data source cannot be inferred by other data sources and stored the de-normalized data, wherein the de-normalizing comprises:
            determining a target quantity for the unique attribute to populate each of a plurality of data groupings,
            splitting the normalized data into a plurality of groupings so that the unique attribute for each grouping does not exceed the target quantity, and
            associating each grouping of the plurality of groupings with a respective unique identifier,
            wherein the de-normalized data includes the plurality of groupings including respective unique identifiers.

13. The system according to claim 12, wherein processor further controls access to and re-identification of the de-normalized data.

14. The system according to claim 13, wherein the processor further controls the actions to be invoked on the de-normalized data based on the role of the user logged into the data provider.

15. The system according to claim 14, wherein the processor further receives a certificate from respective ones of the data sources to invoke a re-identification action.

16. The system according to claim 15, wherein the processor further compares the certificate transmitted from the data source to a stored certificate to authenticate the re-identification action.

17. The system according to claim 13, wherein the processor further generates a table of global unique identifiers to map each unique attribute in the de-normalized data back to the normalized data format to re-identify the normalized data.

18. The transformation engine of claim 12, wherein:
de-normalizing the normalized data further comprises determining an additional target quantity for an additional unique attribute of the normalized data; and
splitting the normalized data comprises splitting the normalized data into a plurality of groupings so that the unique attribute for each grouping does not exceed the target quantity and the additional unique attribute does not exceed the additional target quantity.

19. The transformation engine of claim 12, wherein determining the target quantity comprises using a lowest common denominator of the unique attribute across the normalized data entries as the target quantity.

* * * * *